UNITED STATES PATENT OFFICE.

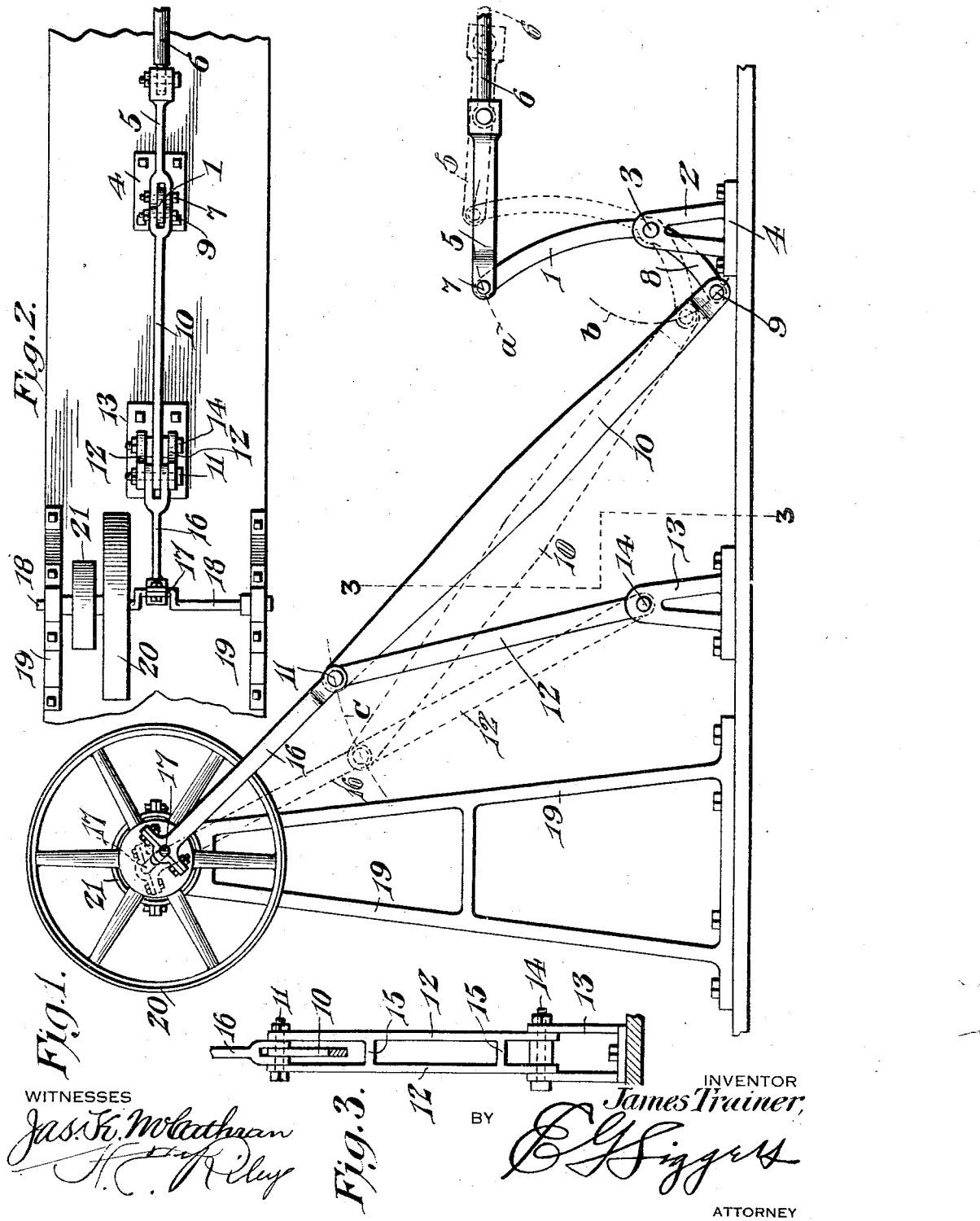

JAMES TRAINER, OF GALLIA, OHIO, ASSIGNOR OF ONE-HALF TO FLAVES T. SLAGLE, OF COLUMBUS, OHIO.

APPARATUS FOR TRANSMITTING POWER.

1,122,818.   Specification of Letters Patent.   Patented Dec. 29, 1914.

Application filed August 8, 1910. Serial No. 576,096.

*To all whom it may concern:*

Be it known that I, JAMES TRAINER, a citizen of the United States, residing at Gallia, in the county of Gallia and State of Ohio, have invented a new and useful Apparatus for Transmitting Power, of which the following is a specification.

The invention relates to an apparatus for transmitting power.

The object of the present invention is to provide a simple, inexpensive and efficient device, designed to be connected with the piston of an engine or other motor, and adapted to advantageously transmit power with increased force to the machine or device to be driven or operated.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a power transmitting device, constructed in accordance with this invention. Fig. 2 is a plan view. Fig. 3 is a transverse sectional view on the line 3—3 of Fig. 1.

Like numerals of reference designate corresponding parts in all the figures of the drawing.

In the embodiment of the invention illustrated in the accompanying drawing, 1 designates an upright lever curved longitudinally and fulcrumed at a point intermediate of its ends in a bracket or support 2 by a transverse pivot 3. The bracket or support has spaced sides and is provided at the bottom with a base plate 4, bolted or otherwise secured to the supporting surface upon which it is mounted.

The bracket or support 2 may be of any desired construction, and the upper arm of the lever is pivoted to the connecting rod 5 of an engine, the piston rod 6 only being shown. The engine may be of any desired type and any other form of motor may be employed for actuating the upright lever.

As shown, the upper arm of the lever 1 is twice as long as the lower arm, and the curvature is such that the arc movement of the pivot 7 of the upper arm approaches closely the line of movement of the actuating piston or motor element 6. The movement of the pivot 7 is indicated by the dotted line *a* of Fig. 1, and in the embodiment shown the length of movement is six inches. The lower arm 8 of the lever 1 is curved and is arranged at an obtuse angle to the curved upper arm, and it is connected by a pivot 9 with an inclined thrust or connecting bar 10, arranged substantially at an angle of forty-five degrees. The arm 8, which is one half the length of the arm 1, has an arcuate movement of three inches on the dotted line *b* of Fig. 1, and at the upper end of the stroke or movement, it is located above and in advance of the position occupied by it at the lower limit of its movement.

The inclined or angularly disposed thrust or connecting bar 10 extends in a direction closely approximating the line of movement of the lower pivot 9, and the inclined thrust or connecting bar is connected by a pivot 11 with the upper end of an upright oscillatory lever 12, fulcrumed at its lower end in a bracket or support 13 by means of a transverse pin or pivot 14, and preferably composed of spaced sides and intermediate connecting portions 15. The bracket or support 13 is provided with a base plate and is bolted or otherwise secured to the supporting surface. The upper pivot 11 of the upwardly extending oscillatory lever moves in an arcuate path indicated by the dotted line *c* of Fig. 1, and the distance of its movement is six inches and corresponds with the length of movement of the upper pivot 7 of the lever 1. The connecting or thrust bar owing to its arrangement at an inclination in the direction of movement of the lower pivot 9 moves a greater distance than it would were it arranged either in a horizontal or vertical position, and the gain or increase in the movement of the thrust of connecting bar is one of the principal advantages resulting from the power transmitting device. The upper end of the connecting or thrust bar is connected by an inclined pitman 16, coinciding with the general direction of the connecting or thrust bar and forming an extension of the same, and extending from the upper pivot thereof to a crank element 17 of the driving shaft 18. The driving shaft 18 is located above and in advance of the plane of the actuating motor element 6, and is journaled in suitable bearings of spaced standards or supports 19, and is equipped with a fly wheel 20 and a pulley 21, adapted to be connected by a belt with the device or machine to be operated, but any other suitable means may be employed for transmitting motion from the driving shaft. The crank element is three inches from its point of connection with the pitman 16 to its center of rotation, the length of its stroke being six inches and corresponding to the length of movement of both the upper pivot of the lever 1 and the upper pivot of the thrust or connecting bar. The power of the actuating motor element is increased by the upright lever 1, and an increase in the power transmitted is also accompanied by an increase in the amount of movement of the transmitting elements, owing to the particular arrangement of the connecting or thrust bar with relation to the direction of movement of the short arm of the actuating lever, and this increase in the movement is preserved and is carried to the driving shaft through the inclination of the pitman and its approximate alinement with the thrust or connecting bar.

Having thus fully described my invention, what I claim as new and desire to secure by Letters Patent, is:—

1. A power transmitting device including a lever pivoted at an intermediate point and having arms of unequal length, the longer arm being designed to be connected with an actuating motor element, a thrust or connecting bar disposed at an angle to the lever and connected at one end with the shorter arm thereof and arranged substantially in the direction of the line of movement of the said shorter arm, a pitman connected to the other end of the thrust or connecting bar and extending in the same general direction as such bar for transmitting motion to a crank element, and an oscillatory lever arranged at an acute angle to the thrust or connecting bar and fulcrumed at one end and pivoted at its other end to the said thrust or connecting bar adjacent to the inner end of the pitman.

2. A power transmitting device including an upright lever pivoted at an intermediate point and having upper and lower arms of unequal length, the lower arm being the shorter and the upper arm being arranged to be connected with an actuating motor element, an inclined thrust or connecting bar connected at its lower end to the shorter arm of the lever, an inclined pitman pivoted to and extending from the upper end of the thrust or connecting bar and arranged in the same general direction as the said bar, and an upright oscillatory supporting lever fulcrumed at its lower end and arranged at an acute angle to the thrust or connecting bar and pivoted to the same at the upper end thereof adjacent to the inner end of the pitman.

3. In combination with a motor element moving in substantially a horizontal plane, a power transmitting device including an upright lever pivoted at an intermediate point and having angularly related upper and lower arms, the upper arm being connected with the said motor element, the point of connection of the said upper arm being movable in an arc closely approximating a horizontal plane, and the lower arm being arranged to move upwardly and downwardly, an inclined connecting or thrust bar pivoted at its lower end to the lower end of the arm of said lever and extending approximately in the direction of the arcuate movement of such pivot, an inclined pitman pivoted to and extending upwardly and forwardly from the upper end of the thrust bar for transmitting motion to a crank element, and an upright supporting lever arranged at an acute angle to the thrust bar and fulcrumed at its lower end and pivoted at its upper end to the upper end of the said thrust bar adjacent to the inner end of the pitman.

4. A power transmitting device including an upright lever fulcrumed at an intermediate point and having curved upper and lower arms of unequal length, the upper arm being the longer and movable through an approximately horizontal arc, and the lower arm being arranged to swing in an inclined arc, an inclined thrust or connecting bar arranged approximately at an angle of forty-five degrees and pivoted at its lower end to the lower arm of said lever and extending approximately in the direction of the arcuate movement of the said pivot, an inclined pitman pivoted to and extending upwardly and forwardly from the upper end of the thrust or connecting bar in the same general direction as the latter, and an upwardly extending supporting lever fulcrumed at its lower end and pivoted at its upper end to the upper end of the thrust or connecting bar and arranged at an acute angle to the latter.

In testimony, that I claim the foregoing as my own, I have hereto affixed my signature in the presence of two witnesses.

JAMES TRAINER.

Witnesses:
 JOHN H. SIGGERS,
 FLAVES T. SLAGLE.

Copies of this patent may be obtained for five cents each, by addressing the "Commissioner of Patents, Washington, D. C."